(12) United States Patent
Katoh

(10) Patent No.: US 8,663,077 B2
(45) Date of Patent: Mar. 4, 2014

(54) BOTTOM BLOCK, A BLOCK-TRANSFERRING TOOL AND A MACHINE TOOL PROVIDED WITH THE BLOCK-TRANSFERRING TOOL

(75) Inventor: Kouichi Katoh, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 941 days.

(21) Appl. No.: 12/782,115

(22) Filed: May 18, 2010

(65) Prior Publication Data

US 2010/0296888 A1 Nov. 25, 2010

(30) Foreign Application Priority Data

May 19, 2009 (JP) ................................. 2009-120451
Feb. 9, 2010 (JP) ................................. 2010-026505

(51) Int. Cl.
*B23Q 3/157* (2006.01)
*B23Q 41/02* (2006.01)
*B65G 67/00* (2006.01)

(52) U.S. Cl.
USPC ............................................ 483/14; 483/901

(58) Field of Classification Search
USPC ........................................ 483/14, 15, 16, 901
See application file for complete search history.

(56) References Cited

U.S. PATENT DOCUMENTS 4,090,287 A * 5/1978 Selander ........................... 483/1
4,312,110 A * 1/1982 Averyanov et al. .............. 483/14
4,555,844 A * 12/1985 Palfery et al. .................... 483/31
4,809,425 A * 3/1989 Monforte ........................... 483/1
5,219,318 A * 6/1993 Vranish ............................ 483/16

FOREIGN PATENT DOCUMENTS

| EP | 2210702 A1 * | 7/2010 | ............. B23Q 7/04 |
|---|---|---|---|
| JP | 61-219547 | 9/1986 | |
| JP | 3-202248 | 9/1991 | |
| JP | 2000-219308 | 8/2000 | |
| JP | 2003-181736 | 7/2003 | |
| JP | 2006-240884 | 9/2006 | |

OTHER PUBLICATIONS

English Language Abstract of JP 2000-219308, published Aug. 8, 2000.
Machine English Language Translation of JP 2000-219308, published Aug. 8, 2000.
Notice of Allowance issued in KR 10-2010-0046205 on Oct. 18, 2012.
English Language Abstract of JP 03-202248 published Sep. 4, 1991.
English Language Abstract of JP 2006-240884 published Sep. 14, 2006.

(Continued)

*Primary Examiner* — David Bryant
*Assistant Examiner* — Jason L Vaughan
(74) *Attorney, Agent, or Firm* — DLA Piper LLP (US)

(57) ABSTRACT

A method of placing a bottom block includes: placing bottom blocks on a block storage area in which a spindle can hold the bottom blocks; attaching a block-transferring tool to the spindle, the block-transferring tool having a main shaft attachment attached to the spindle and a block holder for holding the bottom block; and holding the bottom blocks by the block holder of the block-transferring tool and placing the held bottom blocks on a predetermined workpiece placing position on an upper surface of a table by relative movement.

6 Claims, 17 Drawing Sheets

(56) References Cited

OTHER PUBLICATIONS

English Language Translation of JP 2006-240884 published Sep. 14, 2006.
English Language Abstract of JP 61-219547 published Sep. 29, 1986.
Korean Office Action issued in KR 10-2010-46205 on Nov. 25, 2011.
English Language Abstract of JP 2003-181736 published on Jul. 2, 2003.
English Language Translation of JP 2003-181736 published on Jul. 2, 2003.

* cited by examiner

BOTTOM BLOCK, A BLOCK-TRANSFERRING TOOL AND A MACHINE TOOL PROVIDED WITH THE BLOCK-TRANSFERRING TOOL

The entire disclosure of Japanese Patent Application No. 2009-120451, filed May 19, 2009, and No. 2010-026505, filed Feb. 9, 2010, are expressly incorporated by reference herein.

BACKGROUND OF THE INVENTION

1. Field of the Invention

The present invention relates to a method of placing a bottom block for supporting a workpiece in a manner spaced apart from an upper surface of a table, a block-transferring tool and a machine tool provided with the tool.

2. Description of Related Art

In a machine tool, a to-be-machined article, i.e., a workpiece has been conventionally required to be placed slightly apart from an upper surface of a table when a bottom area of the workpiece is machined.

This will be explained with reference to FIGS. 17A and 17B. In FIG. 17A, a workpiece 100 is placed directly on an upper surface of a table 28. Accordingly, when a bottom A area of the workpiece 100 is machined by a blade 200 of a tool 201 attached to a spindle 30 of a machine tool, the blade 200 damages the upper surface of the table 28. For this reason, the bottom A area of the workpiece 100 cannot be machined.

Consequently, as shown in FIG. 17B, a bottom block 60 is placed under the workpiece 100, whereby the workpiece 100 is slightly lifted apart from the upper surface of the table 28. With this arrangement, even when the bottom A area of the workpiece 100 is machined, the upper surface of the table 28 is not damaged by the blade 200 of the tool, 201.

As a device for placing a workpiece in such a manner, i.e., in a manner so as to lift and support the workpiece apart from the upper surface of the table, a device with use of air pressure (see Document 1: JP-A-2000-219308) is known. However, since such a device needs a complicated structure, a hard block is generally placed under the workpiece.

Herein, such a block to be used under the workpiece is referred to as a "bottom block," most of which in use are made of metal, particularly iron. This is because metal, particularly iron is advantageous for obtaining various shapes of the bottom block. The shapes of the bottom block may take a variety of shapes, e.g., solid, hollow, frame-shaped, box-shaped, stick-shaped, plate-shaped, rail-shaped, T-slotted and the like.

However, when the bottom block as described above is placed on the upper surface of the table, large working load is imposed on an operator and handling of the bottom block is extremely difficult due to, a heavy weight of the bottom block. Moreover, the bottom block needs to be lifted up by a crane or the like when being placed, which causes danger to the operator due to a fall of the bottom block, or damage on the upper surface of a machine table, damage on the bottom block per se or the like. Accordingly, prevention of such danger to the operator, prevention of machinery damage, prevention of damage on the bottom block per se and the like have been desired. In addition, improvement in accuracy of placement position and, eventually, improvement in productivity by an advanced automatic setting of the bottom block have been requested.

SUMMARY OF THE INVENTION

The inventors found that the above problem can be solved by avoiding direct handling of the bottom block by the operator and reached the present invention. Accordingly, an object of the invention is to provide a method of placing the bottom block for improving placement accuracy while securing operator's safety and preventing the machine and the bottom block from being damaged, a block-transferring tool and a machine tool provided with the tool.

According to an aspect of the invention, a method of placing a bottom block on an upper surface of a table of a machine tool, the machine tool including the table on which a workpiece is mounted and a main shaft that are relatively movable in three-dimensional directions, the bottom block supporting the workpiece in a manner spaced apart from the upper surface of the table, the method including: placing the bottom block on a block storage area in which the main shaft holds the bottom block; attaching to the main shaft a block-transferring tool that has a main shaft attachment to be attached to the main shaft and a block holder for holding the bottom block; and placing the bottom block including: by relatively moving the table and the main shaft, holding the bottom block by the block holder of the block-transferring tool; and then, setting the bottom block on a predetermined workpiece placing position on the upper surface of the table.

According to this arrangement, the bottom block is placed on the block storage area in which the main shaft can hold the bottom block, and the block-transferring tool that has the main shaft attachment and the block holder is attached to the main shaft. Subsequently, by relatively moving the table and the main shaft, the block holder of the block-transferring tool holds the bottom block. Then, the held bottom block is placed on the predetermined workpiece placing position on the upper surface of the table. Accordingly, direct manual operation by an operator for handling the bottom block can be eliminated.

Thus, safety to the operator can be enhanced. Moreover, avoidance of such a man power operation by the operator results in prevention of damage of a machine table or other parts caused by the fall of the bottom block, and damage of a bottom block per se. Further, improvement in positioning accuracy can be expected since the bottom block is placed by relatively moving the table and the main shaft.

In the method of placing the bottom block according to the aspect of the invention, it is preferable that the placing the bottom block includes: positioning the block-transferring tool at a predetermined position; lifting up the bottom block by the block-transferring tool positioned at the predetermined position; and positioning the lifted bottom block on the workpiece placing position to place the lifted bottom block.

According to this arrangement, in placing the bottom block, the block-transferring tool is positioned at the predetermined position; the bottom block is lifted up by the block-transferring tool positioned at the predetermined position; and the lifted bottom block is positioned and placed on the workpiece placing position. In other words, the bottom block is transferred and placed while being lifted. Accordingly, without damaging the bottom block and the upper surface of the table, the bottom block can be placed.

The method of placing the bottom block according to the aspect of the invention preferably includes: attaching the block-transferring tool to the main shaft in place of a machining tool for machining the workpiece after machining the workpiece; and returning the bottom block including: by relatively moving the table and the main shaft, holding the bottom block placed on the workpiece placing position; and putting back the bottom block to the block storage area by the block holder of the block-transferring tool.

According to this arrangement, after machining the workpiece, the block-transferring tool is attached to the main shaft in place of the machining tool for machining the workpiece; and the bottom block placed on the workpiece placing position is held and put back to the block storage area by the block holder of the block-transferring tool by relatively moving the table and the main shaft. Accordingly, the bottom block can be safely returned and damages of the machine table, other parts of the machine tool and the bottom block per se can be avoided.

According to another aspect of the invention, a block-transferring tool for placing a bottom block on an upper surface of a table of a machine tool on which a workpiece is mounted, the machine tool including the table and a main shaft that are relatively movable in three-dimensional directions, the bottom block supporting the workpiece in a manner spaced apart from the upper surface of the table, the tool including: a main shaft attachment attached to the main shaft; a block holder for holding the bottom block; and a separator provided between the main shaft attachment and the block holder.

According to this arrangement, with the use of a function of the machine tool, of which main shaft is attached with the block-transferring tool, the bottom block can be placed from the block storage area to the workpiece placing position and returned from the workpiece placing position to the block storage area.

In the block-transferring tool according to the aspect of the invention, it is preferable that the bottom block includes: a bottom wall placed on the table; a top wall provided in parallel to and apart from the bottom wall; and side walls for connecting both ends of the bottom wall and the top wall, the bottom block being formed in a cross-sectionally rectangular frame internally having a space, and the block holder includes: an extension piece extending in an axial direction of the main shaft attachment; and an insert piece provided on an end of the extension piece substantially orthogonally to the extension piece, the insert piece being capable of being inserted into the space of the bottom block.

According to this arrangement, the bottom block is formed in a cross-sectionally rectangular frame internally having the space and the block holder is provided with the insert piece that can be inserted into the space. Accordingly, the insert piece is inserted into the space of the bottom block to lift up the bottom block. Consequently, the bottom block can be easily lifted up and the insert piece can be easily pulled out from the space of the bottom block at a target position. Thus, the bottom block can be transferred by simple operations.

In the block-transferring tool according to the aspect of the invention, it is preferable that the insert piece includes: a first insert piece provided on the end of the extension piece substantially orthogonally to the extension piece, the first insert piece being capable of being inserted into the space of the bottom block; and a second insert piece provided on the extension piece substantially orthogonally to the extension piece and projecting toward the opposite side of the first insert piece, the second insert piece being capable of being inserted into the space of the bottom block, the first insert piece and the second insert piece being respectively provided at different heights in an extending direction of the extension piece.

Since this arrangement is provided with the first insert piece and the second insert piece, two bottom blocks can be simultaneously lifted up. Accordingly, the bottom blocks can be efficiently transferred to and returned from the workpiece placing position.

In the block-transferring tool according to the aspect of the invention, it is preferable that the block holder includes a lock mechanism for pressing a part of the bottom block to the insert piece for locking.

Since this arrangement is provided with the lock mechanism for pressing a part of the bottom block to the insert piece for locking, the bottom block can be reliably held. Accordingly, the bottom block is less likely to fall in the course of the bottom block transfer while being lifted.

In the block-transferring tool according to the aspect of the invention, it is preferable that the bottom block includes: a bottom wall placed on the table; a top wall provided in parallel to and apart from the bottom wall; and side walls for connecting both ends of the bottom wall and the top wall, the bottom block being formed in a cross-sectionally rectangular frame internally having a space, and the block holder includes: press portions provided substantially orthogonally to an axial direction of the main shaft attachment and in directions opposing each other, press portions being capable of being inserted into a space of the bottom block; and a lock mechanism that presses the press portions in directions separating from each other.

According to this arrangement, when the lock mechanism is operated, the press portions are moved in the directions separating from each other to press the side walls on both sides of the bottom block. In other words, the press portions prop the side walls to support. Accordingly, even when the block-transferring tool is attached to a main shaft of machines such as a horizontal machining center, the bottom block can be safely transferred to a desired position.

In the block-transferring tool according to the aspect of the invention, it is preferable that the lock mechanism includes an actuator that is driven by the air supplied through the main shaft to which the main shaft attachment is attached.

According to this arrangement, the lock mechanism includes the actuator that is driven by the air supplied through the inside of the main shaft to which the main shaft attachment is attached. Accordingly, without any separate power source, the locking of the lock mechanism can be effected by using the air supplied in the machine tool. Consequently, the size of the block-transferring tool can be reduced.

A machine tool according to still another aspect of the invention includes: a table on which a workpiece is mounted; a main shaft; a relative movement mechanism for relatively moving the table and the main shaft in three-dimensional directions; a block-transferring tool and a machining tool that are detachably attached to the main shaft; a tool magazine for housing the block-transferring tool and the machining tool; and a tool changer for attaching specified one of the block-transferring tool and the machining tool housed in the tool magazine to the main shaft, in which a block storage area is provided on an upper surface of the table for placing a rectangular-shaped bottom block that supports the workpiece in a manner spaced apart from the upper surface of the table, and the block-transferring tool includes: a main shaft attachment attached to the main shaft; a block holder for holding the bottom block; and a separator provided between the main shaft attachment and the block holder.

According to this arrangement, the same advantages as in the above method for placing the bottom block can be obtained.

DETAILED DESCRIPTION OF PREFERRED EMBODIMENT(S)

First Exemplary Embodiment

A first embodiment of the present invention will be described below with reference to FIGS. 1 to 4C.

Figure 1:
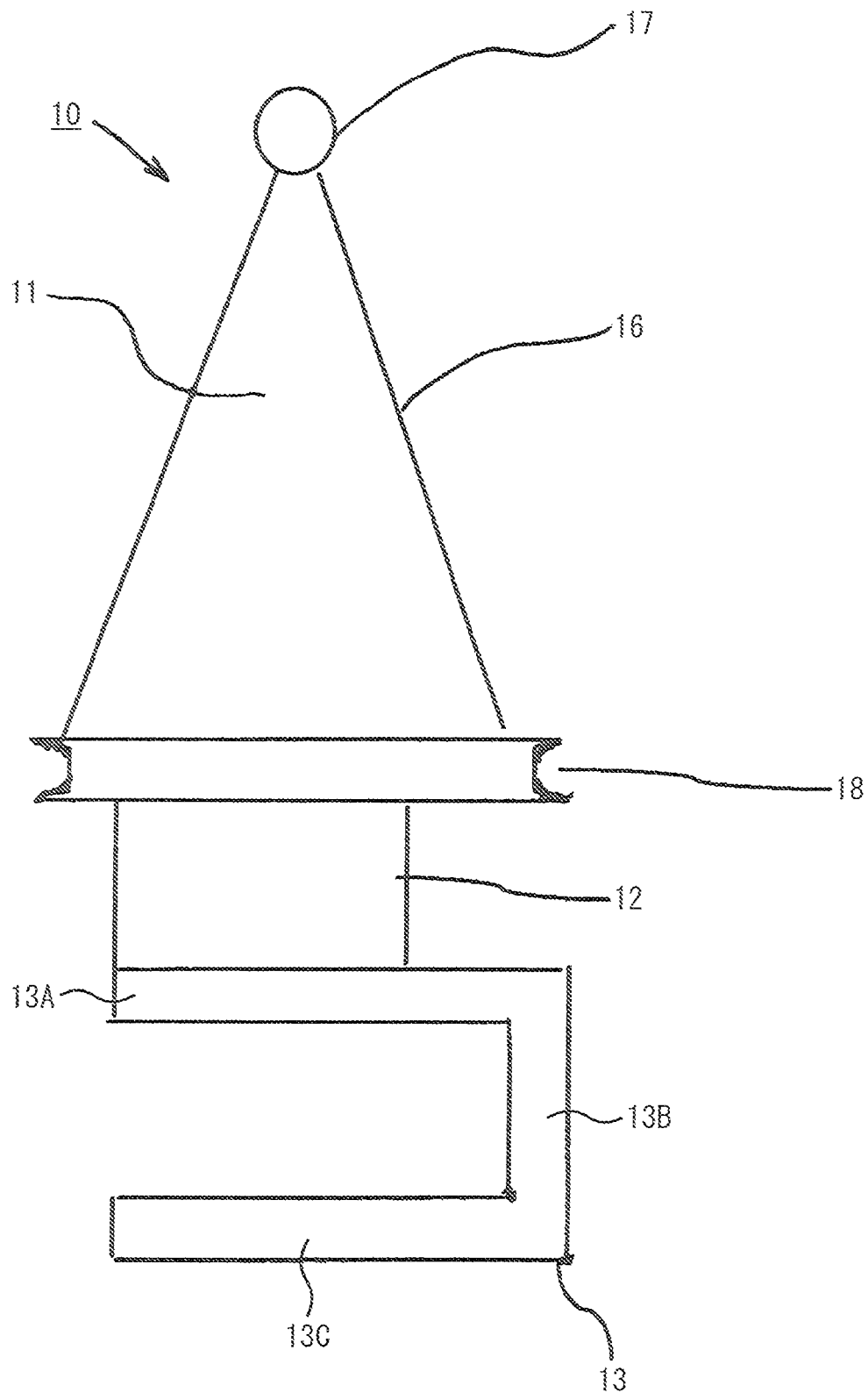
FIG. 1 is a front view showing a block-transferring tool according to an exemplary embodiment of the invention.

FIG. 1 is an illustration showing a block-transferring tool 10 to be used in the first exemplary embodiment. The tool 10 has the same shape as a tool to be used for automatically changing a tool in a machine tool. Accordingly, the tool 10 can be handled in the same manner as the tool of the machine tool.

Figure 2:
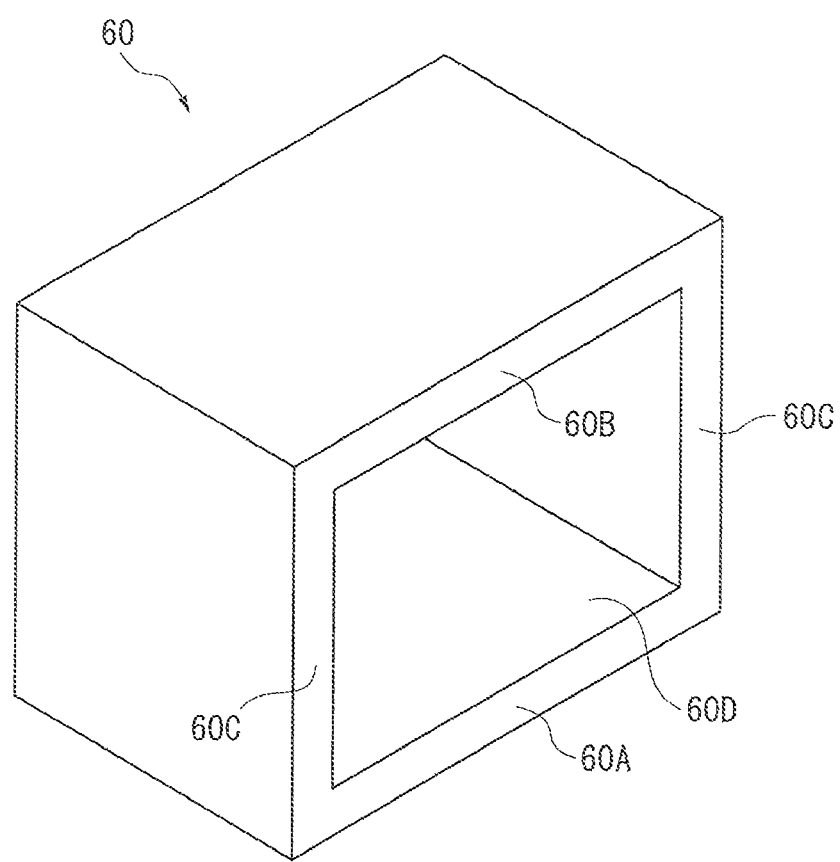
FIG. 2 is a perspective view showing an example of a bottom block to be used in the exemplary embodiment of the invention.

The block-transferring tool 10 is adapted to correspond mainly to a frame-shaped bottom block 60 and includes a main shaft attachment 11, a separator 12 and a block holder 13. As shown in FIG. 2, the bottom block 60 is formed in a frame of a rectangular cross section, including a bottom wall 60A placed on a table of the machine tool, a top wall 60B provided in parallel to and apart from the bottom wall 60A, and side walls 60C for connecting both ends of the bottom wall 60A and the top wall 60B.

The main shaft attachment 11 is attachable to a main shaft of the machine tool in the same manner as a machining tool having a general cutting blade such as a drill and cutter. Accordingly, the main shaft attachment 11 includes a tapered shank 16 inserted into the main shaft, a chuck top 17 provided on a smaller-diameter side of the tapered shank 16, and a tool-gripping ring 18 provided on a larger-diameter side of the tapered shank 16.

The separator 12 is a cylinder interposed between the main shaft attachment 11 and the block holder 13. The main shaft attachment 11 has a variety of axial lengths so as to match a size and a thickness of the bottom block 60.

The block holder 13 is formed in a square C shape. Specifically, the block holder 13, which is formed in a square C shape, includes an attachment piece 13A horizontally attached to a lower surface of the separator 12, an extension piece 13B extending from one end of the attachment piece 13A in an axial direction of the main shaft attachment 11, and an insert piece 13C provided on an end of the extension piece 13B substantially orthogonally to the extension piece 13B and in parallel to the attachment piece 13A, the insert piece 13C being capable of being inserted into a space 60D of the bottom block 60.

A length of the extension piece 13B, i.e., an interval between the attachment piece 13A and the insert piece 13C is formed to be larger than a thickness of the frame (the top wall 60B) of the bottom block 60. Accordingly, the top wall 6013 of the bottom block 60 is inserted between the attachment piece 13A and the insert piece 13C, and lifted up by the insert piece 13C, whereby the bottom block 60 is transferred.

Figure 3:
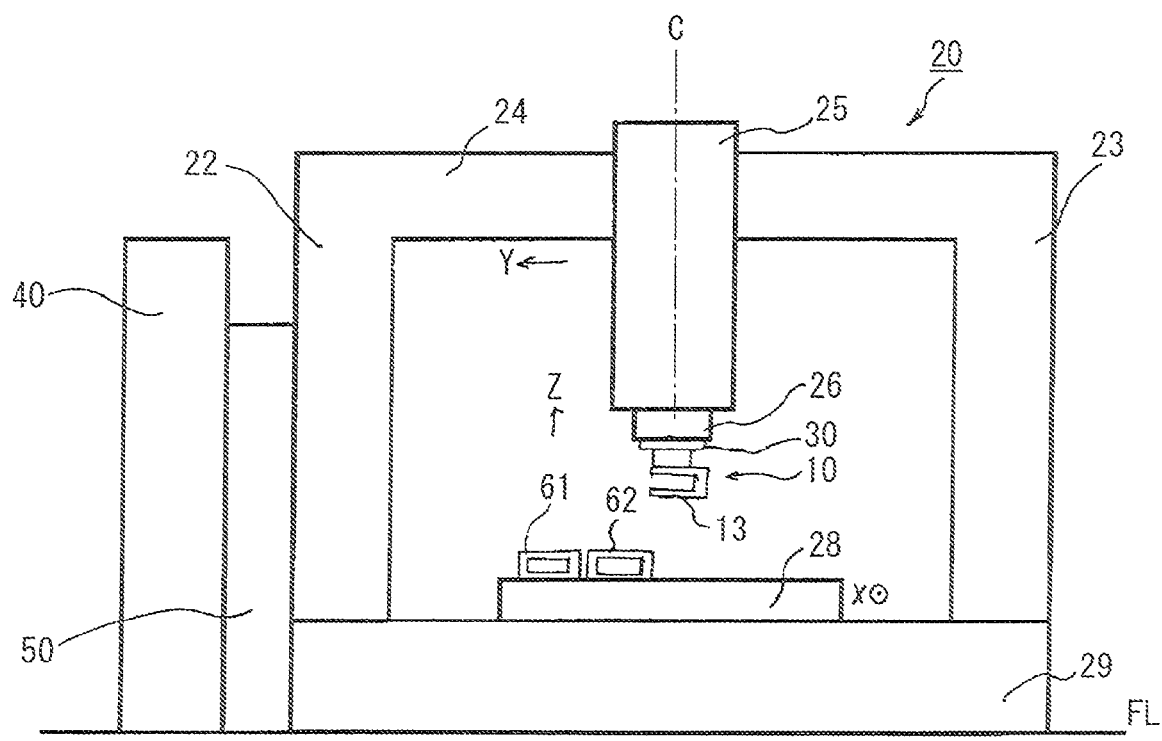
FIG. 3 is a schematic view showing a machine tool according to an exemplary embodiment of the invention.

FIG. 3 is an illustration showing a machine tool 20 for placing the bottom block 60 with use of the tool 10.

The machine tool 20, which is a portal-framed machine tool, includes a left column 22, a right column 23 and a beam 24, which are integrally formed of casting so as to enhance machinery rigidity.

A spindle head 25 is movably attached to the beam 24 in a horizontal direction of FIG. 3 (Y axis) by a servo motor and the like. A spindle 30 is movably attached to the spindle head 25 in a vertical direction of FIG. 3 (Z axis) by a ram 26. The spindle 30 includes a servo motor that consecutively rotates the spindle 30 and detects a rotation positioning of the spindle 30 along a C axis (a rotation axis parallel to the Z axis).

A table 28 on which the workpiece is mounted is provided movably in a front-back direction of FIG. 3 (X axis) on an upper surface of a bed 29 between the left column 22 and the right column 23. Accordingly, the table 28 on which the workpiece is mounted and the spindle 30 (the main shaft) are movable in three-dimensional directions of X, Y and Z axes by a relative movement mechanism (not shown).

A part of the table 28, for example, on a farther side of the upper surface of the table 28 (on a side of minus direction transfer of the table in X axis coordinates), is provided with a block storage area for placing a plurality of the bottom blocks 60 (61 to 66).

A tool magazine 40 and an automatic tool changer 50 are annexed to the left column 22. The tool magazine 40 houses the block-transferring tool 10 and a lot of machining tools which are attached to the spindle 30 (the main shaft). The automatic tool changer 50 is operated to attach to the spindle 30 (the main shaft) designated one of tools among the block-transferring tool 10 and the machining tool housed in the tool magazine 40 while returning the tool attached to the spindle 30 to the tool magazine 40. In short, the automatic tool changer 50 changes tools between the tool magazine 40 and the spindle 30 (the main shaft).

Figure 4A:
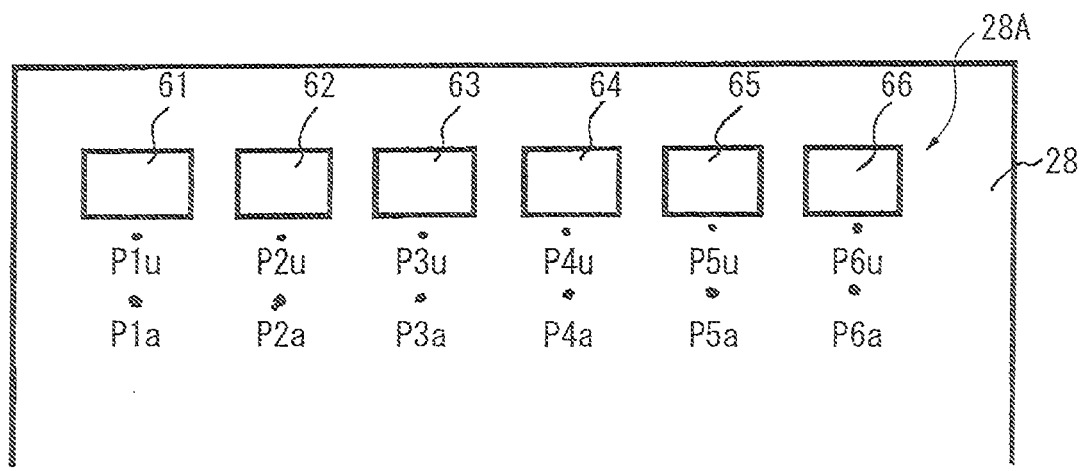
FIG. 4A is an illustration showing a layout of the bottom blocks on a table according to the above exemplary embodiment.
Figure 4B:
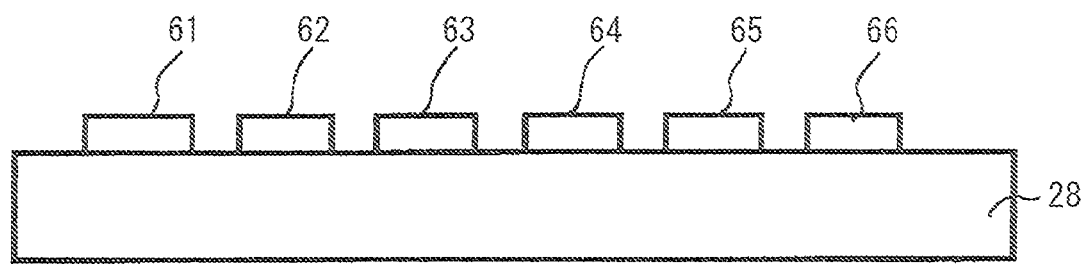
FIG. 4B is an illustration showing a layout of the bottom blocks on the table according to the above exemplary embodiment.
Figure 4C:
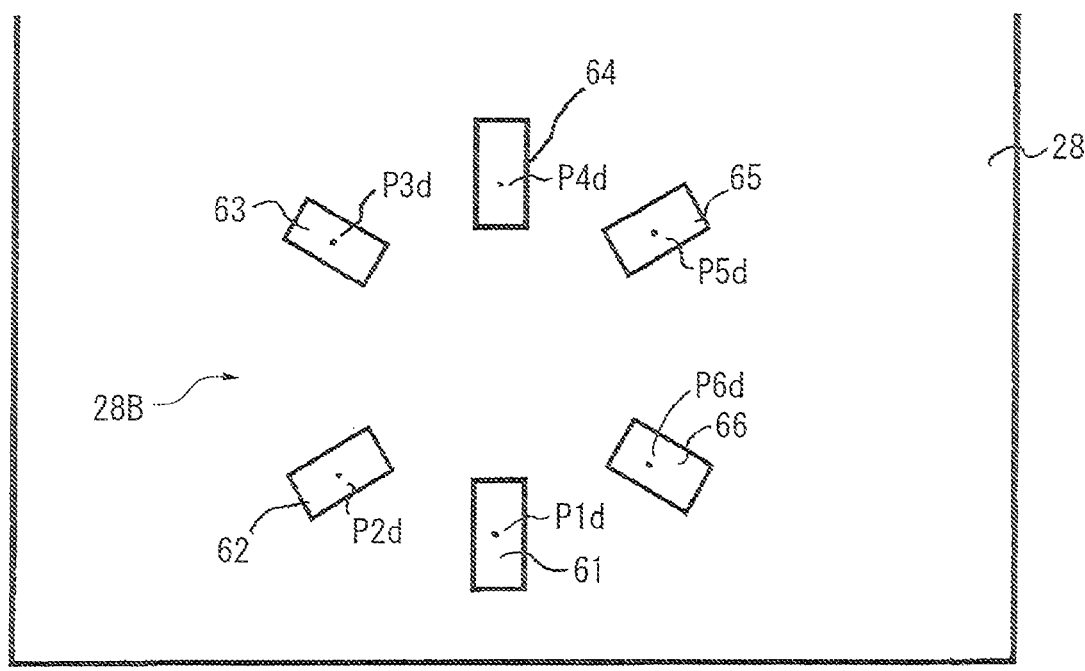
FIG. 4C is an illustration showing a layout of the bottom blocks on the table according to the above exemplary embodiment.

FIGS. 4A to 4C are illustrations respectively showing a layout on the upper surface of the table 28 of the machine tool 20.

FIG. 4A is an overhead view of the table 28. FIG. 4B is a front view of the table 28. Six bottom blocks 60 (61 to 66) are respectively placed at a certain interval on the block storage area 28A of the table 28. Placing positions of the bottom blocks 61 to 66 are respectively defined as coordinates (X11, Y11, Z11) to (X16, Y16, Z16) as coordinates of each center position on the upper surface.

FIG. 4C shows a layout of the transferred six bottom blocks 61 to 66 on the block storage area 28A of the table 4. Here, the six bottom blocks 61 to 66 are placed at a predetermined angular interval on the same circumference in the workpiece-placing position 28B of the table 28. At this time, placing positions of the bottom blocks 61 to 66 are respectively defined as coordinates (X21, Y21, Z21) to (X26, Y26, Z26) as coordinates of each center position on the upper surface.

Explanation about Manual Method of Placing Bottom Blocks

Firstly, an explanation will be given for a method of manual or MDI (Manual Data Input) operation of the machine tool 20, in other words, a manual or semiautomatic method for placing the bottom blocks 61 to 66.

(1) Firstly, the bottom blocks 61 to 66 are placed on the block storage area 28A in which the spindle 30 can hold the bottom blocks 61 to 66 (block preparation step).

Here, the six bottom blocks 61 to 66 are placed on the farther side of the upper surface of the table 28 (on a side of minus direction transfer of the table in X axis coordinates).

(2) Next, the block-transferring tool 10 is attached to the spindle 30 (the main shaft) (tool attachment step).

Here, the machine tool 20 is used to select the block-transferring tool 10 in the same manner as in changing machining tools. In other words, a tool changing command is given, whereby the block-transferring tool 10 is attached to the spindle 30. Alternatively, without a tool changing command, the block-transferring tool 10 may be completely manually attached to the spindle 30.

(3) Next, the bottom block (firstly, the bottom block 61) is held by the block holder 13 of the block-transferring tool 10 by relative movement of a relative movement mechanism. Subsequently, the bottom block 61 is placed on the predetermined workpiece placing position 28B on the upper surface of the table 28 (block placement step).

Specific operations are as follows.

(3-1) The machine tool 20 is manually operated to transfer the block-transferring tool 10 near the block storage area 28A where the bottom block 61 is placed. The operation may be performed manually or by MDI (approach to the bottom block 61). For example, in order to firstly transfer the bottom block 61, the block-transferring tool 10 is moved near P1a of FIG. 4A to be positioned.

(3-2) Here, it is examined whether a direction of the block holder 13 of the block-transferring tool 10 has been rotated in a direction for lifting up the frame of the bottom block 61. When the block holder 13 of the block-transferring tool 10 is not directed in a direction for lifting up the frame of the bottom block 61, the C axis of the spindle 30 is rotated to be directed in a direction for lifting up the frame (confirmation of the direction of the block-transferring tool).

(3-3) Further, the spindle 30 is adjusted to be at a height where the bottom block 61 can be lifted up. In other words, a position of the spindle 30 in the Z-axis direction is adjusted.

Subsequently, with a relative movement in the X axis direction, the insert piece 13C of the block-transferring tool 10 is inserted into the space 61D of the bottom block 61. After that, with a relative movement in the Z axis direction, the frame of the bottom block 61 is lifted up by the block holder 13 of the block-transferring tool 10 and the bottom block 61 is lifted up (approach of the block-transferring tool and lifting-up thereby). This operation is carried out at a position of P1U in FIG. 4A.

(3-4) The block-transferring tool 10 is transferred to the workpiece placing position 28B, where a placing direction of the bottom block 61 is adjusted by a rotation of the C axis. Subsequently, the bottom block 61 is lowered in the Z axis direction for placement (placement of the bottom block). The bottom block 61 is placed at a position of P1d in FIG. 4C which shows the transferred bottom block 61.

(3-5) The spindle 30 is moved for pulling out the block-transferring tool 10 from the transferred bottom block 61.

(4) Next, a second bottom block 62 is transferred to the workpiece placing position 28B in the same manner as the first bottom block 61 is firstly transferred. Subsequently, the second bottom block 62 is placed in predetermined position and direction on the workpiece placing position 28B.

The same operation is repeated until a final bottom block 66 of the target bottom blocks is placed, whereby a plurality of the bottom blocks 61 to 66 are placed in the predetermined directions on the workpiece placing position 28B.

After the bottom blocks 61 to 66 are thus placed on the workpiece placing position 28B, a workpiece is placed on the bottom blocks 61 to 66 and is machined. For machining, a machining tool for machining the workpiece is attached to the spindle 30 in place of the block-transferring tool 10. Then, the workpiece is machined by the machining tool.

(5) After machining the workpiece, the block-transferring tool 10 is attached to the spindle 30 in place of the machining tool for machining the workpiece (tool changing step).

The machine tool 20 is used to select the block-transferring tool 10 in the same manner as in changing the machining tools. In other words, a tool changing command is given and the block-transferring tool 10 is attached to the spindle 30. Alternatively, without a tool changing command, the block-transferring tool 10 may be completely manually attached to the spindle 30.

(6) Next, the bottom blocks 61 to 66 placed on the workpiece placing position 28B are held by the block holder 13 of the block-transferring tool 10 by relative movement of the relative movement mechanism. Subsequently, the bottom blocks 61 to 66 are returned to the workpiece placing position 28B (block returning step). Thus, a series of operations including placing the bottom blocks 61 to 66, machining the workpiece and returning the bottom blocks 61 to 66 are completed.

The above explanation is given for the manual or semiautomatic method of placing the bottom blocks 60 (61 to 66). In short, the block-transferring tool 10 is attached to the spindle 30 of the machine tool 20; the spindle 30 is brought near the block storage area 28A, where the bottom blocks 61 to 66 are placed, by using an X-Y-Z-axes transfer function of the relative movement mechanism; the direction of the block-transferring tool 10 is matched to the direction of the bottom blocks 61 to 66 by C-axis rotation positioning of the spindle 30; and the block-transferring tool 10 is inserted into the bottom blocks 61 to 66 to a position where the bottom blocks 61 to 66 can be lifted up; and by lifting up in the Z axis direction, the bottom blocks 61 to 66 are transferred to the workpiece placing position 28B. On the workpiece placing position 28B, after the directions of the bottom blocks 61 to 66 are adjusted, the bottom blocks 61 to 66 are lowered in the Z axis direction for placement. Then, the block-transferring tool 10 is pulled out from the bottom blocks 61 to 66 and returns to the original position. These operations are repeated.

Explanation about Method of Placing Bottom Blocks by Automatic Program

Next, an explanation will be given for a method of placing the bottom blocks 61 to 66 by an automatic program using an NC machining program, which is used in a numeric controller, for transfer and placement of the bottom blocks 61 to 66. The block-transferring tool 10 is housed in the tool magazine 40 as general tools in this exemplary embodiment in the same manner as in the manual method.

Contents of the automatic program will be explained. The example shows that the bottom blocks 61 to 66 are sequentially transferred from positions on the block storage area 28A of FIG. 4A and placed on the workpiece placing position 28B of FIG. 4C.

(11) First, a tool changing command Tnnn is given for changing a tool attached to the spindle 30 to the block-transferring tool 10 and transfer the spindle 30 to a waiting position Pw (Pw may be any convenient position for the workpiece) (tool attachment step).

(12) Next, an X-Y-Z axes transfer command is given for transferring the spindle 30 to an approach position P1a of the bottom block 61. By this operation, the spindle 30 is transferred to the approach position P1a of the bottom block 61.

(13) A C-axis orientation is performed to adjust the direction of the block-transferring tool 10 to a direction for lifting up the bottom block 61.

(14) An X-axis transfer command is given for transferring the spindle 30 to a lift position P1u of the bottom block 61. By this operation, the spindle 30 is transferred to the lift position P1u.

(15) A Z-axis command is given for lifting up the bottom block 61.

(16) An X-Y axes transfer command is given for transferring the spindle 30 to a workpiece placing position P1d. By this operation, the spindle 30 is transferred to the workpiece placing position P1d.

(17) At the position P1d where the spindle 30 is transferred, a C-axis rotation command is given for directing the bottom block 61 in a desirable direction. By this operation, the direction of the bottom block 61 is set to be oriented in the desirable direction.

(18) A transfer command for lowering in the Z axis direction is given. By this operation, the bottom block 61 is lowered for placement.

(19) An X-axis transfer command is given for pulling out the block holder 13 from the bottom block 61, and then, a Z-axis transfer command is given for lifting up the block holder 13.

(20) The spindle 30 is transferred to the waiting position Pw.

(21) The spindle 30 is transferred to an approach position P2a of a next bottom block 62 and a transfer command is given in the same manner as in the first bottom block 61.

(22) Program commands are given until the final bottom block 66 is transferred.

It is explained in this example that the bottom blocks 61 to 66 are sequentially transferred for placement, but operation steps of the bottom blocks 61 to 66 are not limited thereto. The operation steps may include a program by which the bottom blocks 61 to 66 are randomly transferred for placement.

Moreover, in the explanation, the spindle 30 is brought back to the original waiting position for transferring the bottom blocks 61 to 66, but operation steps are not limited thereto. The operation steps may include a command program for advancing directly to a position of the next bottom block.

As explained above, in the above exemplary embodiment, the machine tool 20 is controlled for lifting and transferring the bottom blocks 61 to 66 for placement by the manual program, the semiautomatic program by MDI commands or the automatic program using the machining program of a numeric controller so that the bottom blocks 61 to 66 are placed at the predetermined coordinates; the block-transferring tool 10 is housed in the tool magazine 40 in the same manner as general tools, attached to the spindle 30 in the same manner as in changing the machining tools to lift up the bottom blocks 61 to 66. Thus, such a man power operation as the operator directly handles the bottom block can be avoided.

Accordingly, safety to the operator can be enhanced. Moreover, avoidance of such a man power operation by the operator results in prevention of damage of a machine table or other parts caused by a fall of a bottom block, and damage of a bottom block per se. Further, improvements in placing position accuracy and direction accuracy can be expected since the bottom block is positioned by a numeric controller (NC).

Explanation of Modification(s)

In the above exemplary embodiment, the frame-shaped bottom blocks 60, 61 to 66 are placed at the predetermined coordinates on the block storage area 28A, lifted up by using the block-transferring tool 10, and transferred for placement to the workpiece placing position 28B by using the X-Y-Z-C axes transfer positioning mechanism. However, the invention is not limited to this exemplary embodiment but can employ various modifications.

Modification(s) of Tool for Bottom Block Transfer

The block-transferring tool may have structures, for instance, as shown in FIGS. 5 to 14.

Figure 5:
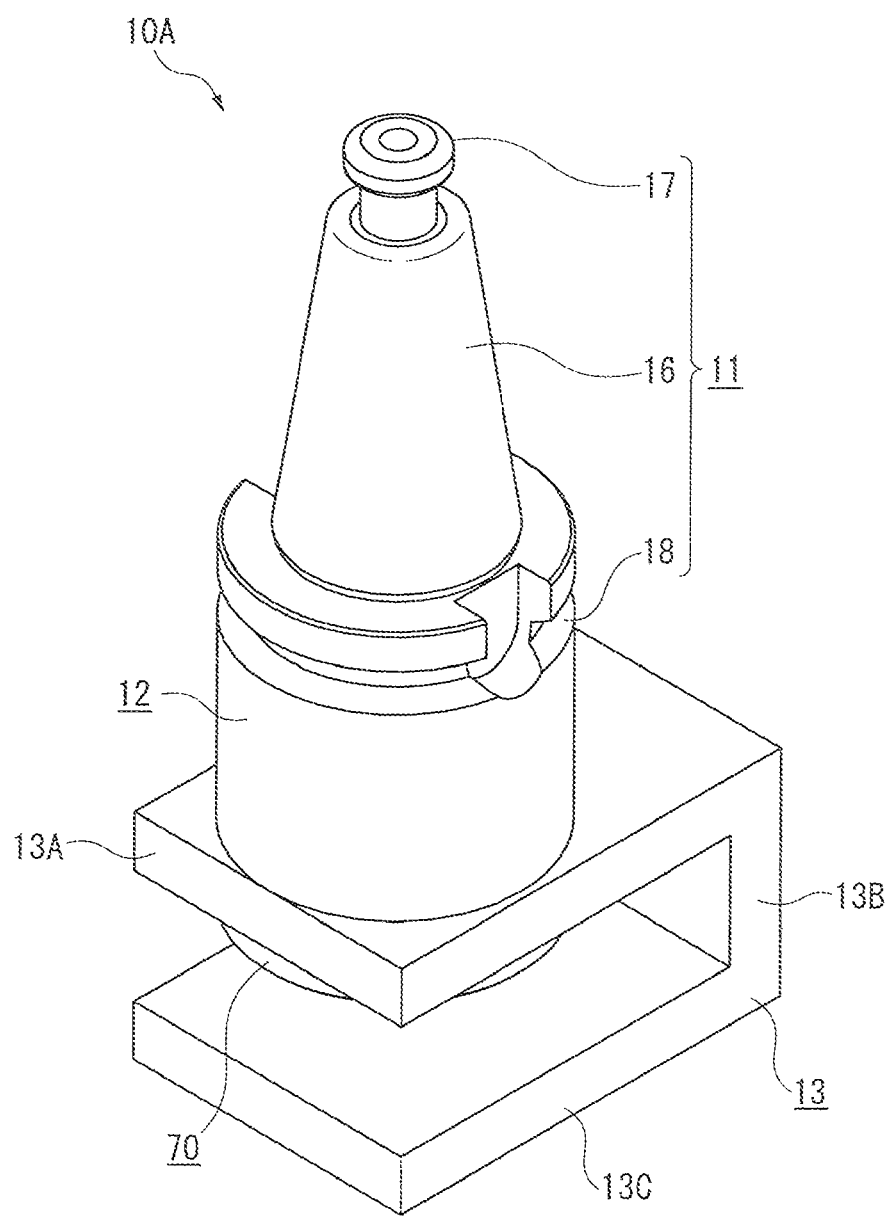
FIG. 5 is a perspective view showing a first modification of the block-transferring tool of the invention.
Figure 6:
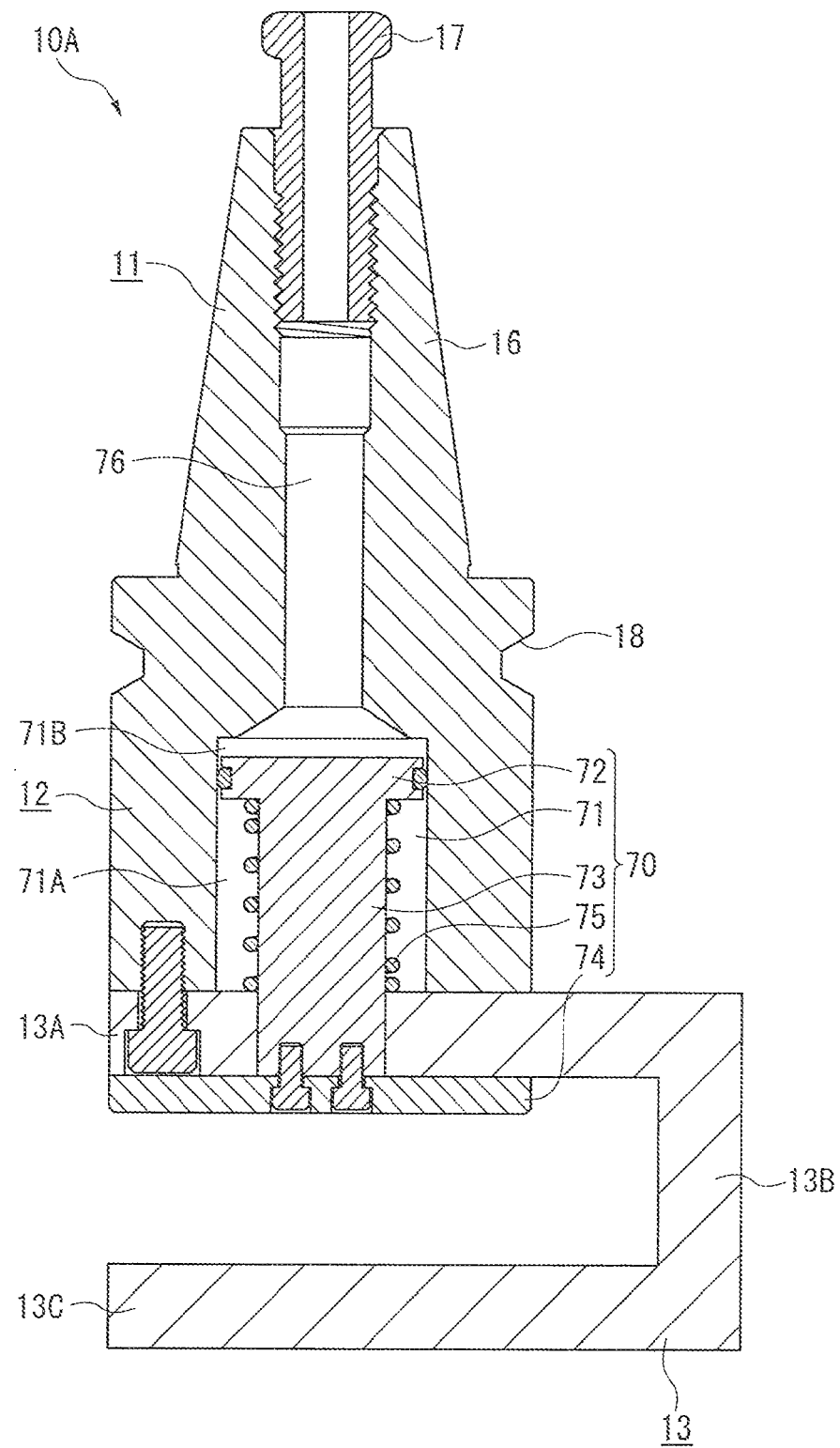
FIG. 6 is a cross sectional view showing the first modification of the invention.

FIGS. 5 and 6 each are illustrations showing a first modification of the block-transferring tool.

A block-transferring tool 10A is provided with a lock mechanism 70 on an attachment piece 13A of a block holder 13, the lock mechanism pressing a part of a bottom block 60 to an insert piece 13C for locking.

The lock mechanism 70 includes: a cylinder chamber 71 formed inside the separator 12; a piston 72 slidably housed in the cylinder chamber 71; a piston rod 73 integrally formed with the piston 72 through the attachment piece 13A; a press piece 74 fixed to an end of the piston rod 73 by a screw and the like; and a spring 75 that is housed in one chamber 71A (lower chamber) in the cylinder 71 partitioned by the piston 72 and biases the piston 72 in a direction for the press piece 74 to separate from the insert piece 13C. The other chamber 71B (upper chamber) of the cylinder 71 is supplied with compressed air through an air passage 76 formed in the main shaft attachment 11 and an air passage formed in the main shaft (spindle 30). In other words, the lock mechanism 70 includes an actuator that is driven by the air supplied through the main shaft.

Accordingly, according to the block-transferring tool 10A, when air is supplied to the other chamber 71B of the cylinder 71 through the air passage 76, the piston 72 is moved downwardly from the middle of FIG. 6 while compressing the spring 75, thereby gripping the frame (mainly, the top wall 60B) of the bottom block 60 between the press piece 74 and the insert piece 13C. Accordingly, the bottom block 60 can be safely transferred to a desired position.

Figure 7:
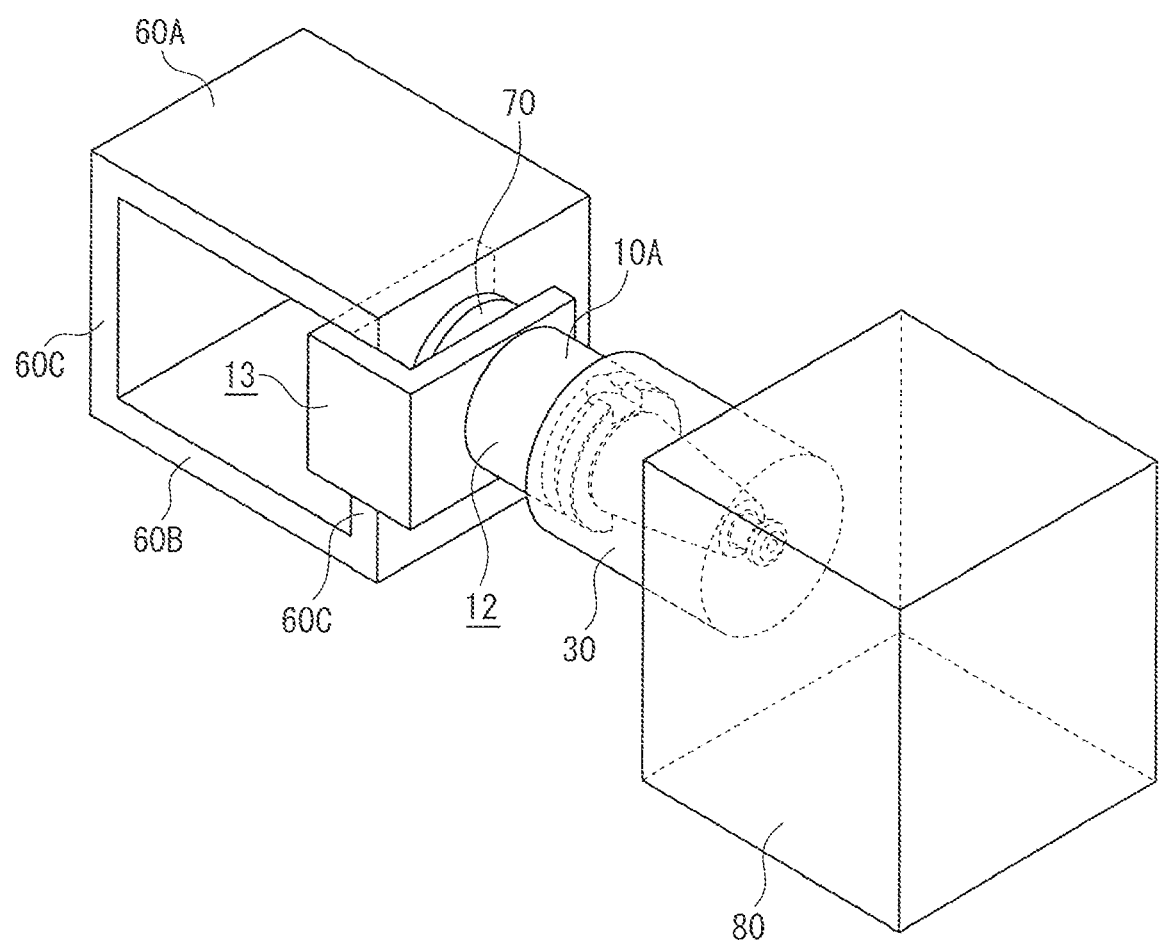
FIG. 7 is an illustration showing the first modification of the invention in use.

When the block-transferring tool 10A is used for a machine in which the spindle 30 of the main shaft is horizontally oriented, for instance, a machine such as a horizontal machining center or a machine provided with a horizontal attachment 80 as shown in FIG. 7, the frame (mainly, the side wall 60C) of the bottom block 60 is gripped between the press piece 74 and the insert piece 13C.

Figure 8A:
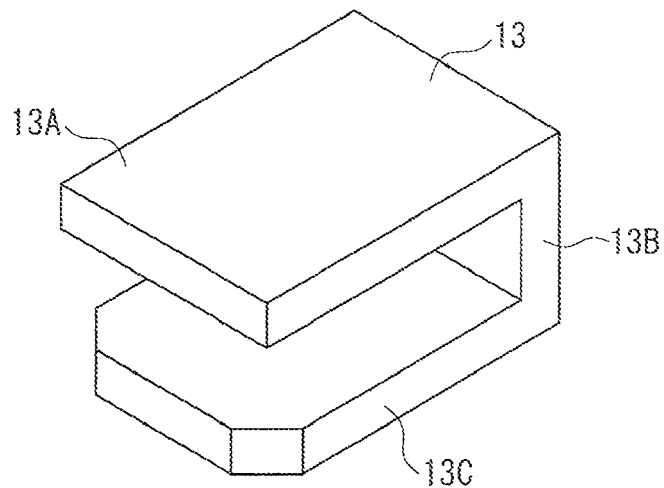
FIG. 8A is an illustration showing a modification of the block holder according to the exemplary embodiment and the first modification of the invention.
Figure 8B:
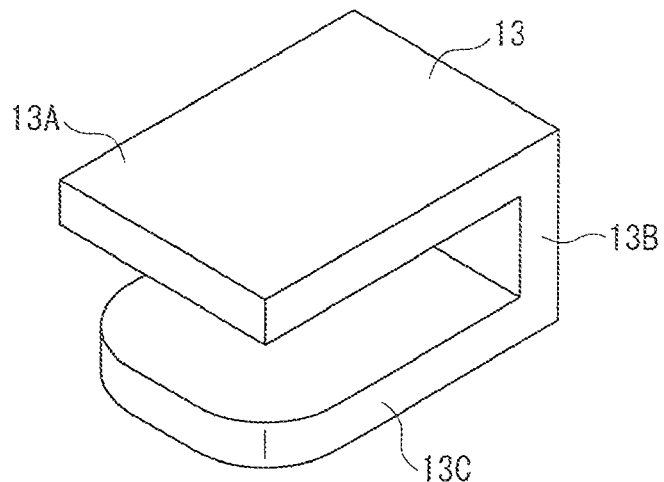
FIG. 8B is an illustration showing another modification of the block holder according to the exemplary embodiment and the first modification of the invention.
Figure 8C:
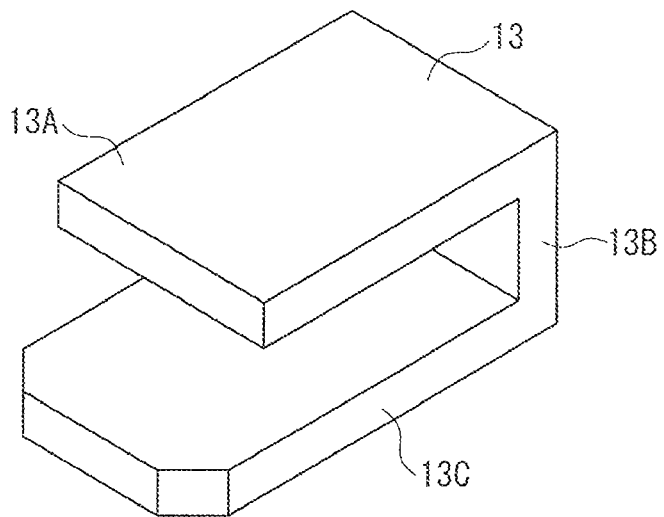
FIG. 8C is an illustration showing a still another modification of the block holder according to the exemplary embodiment and the first modification of the invention.

In the block-transferring tool 10 as shown in FIG. 1 and in the block-transferring tool 10A as shown in FIGS. 5, 6 and 7, the insert piece 13C of the block holder 13 may be shaped as shown in FIGS. 8A, 8B and 8C.

In the block holder 13 shown in FIG. 8A, a tip corner of the insert piece 13C is chamfered at 45 degrees. In the block holder 13 shown in FIG. 8B, a tip corner of the insert piece 13C is rounded (R processed). In the block holder 13 shown in FIG. 8C, the insert piece 13C is formed to be longer than the attachment piece 13A. Such arrangements provide an advantage that the insert piece 13C is easily inserted into the frame of the bottom block 60.

Figure 9:
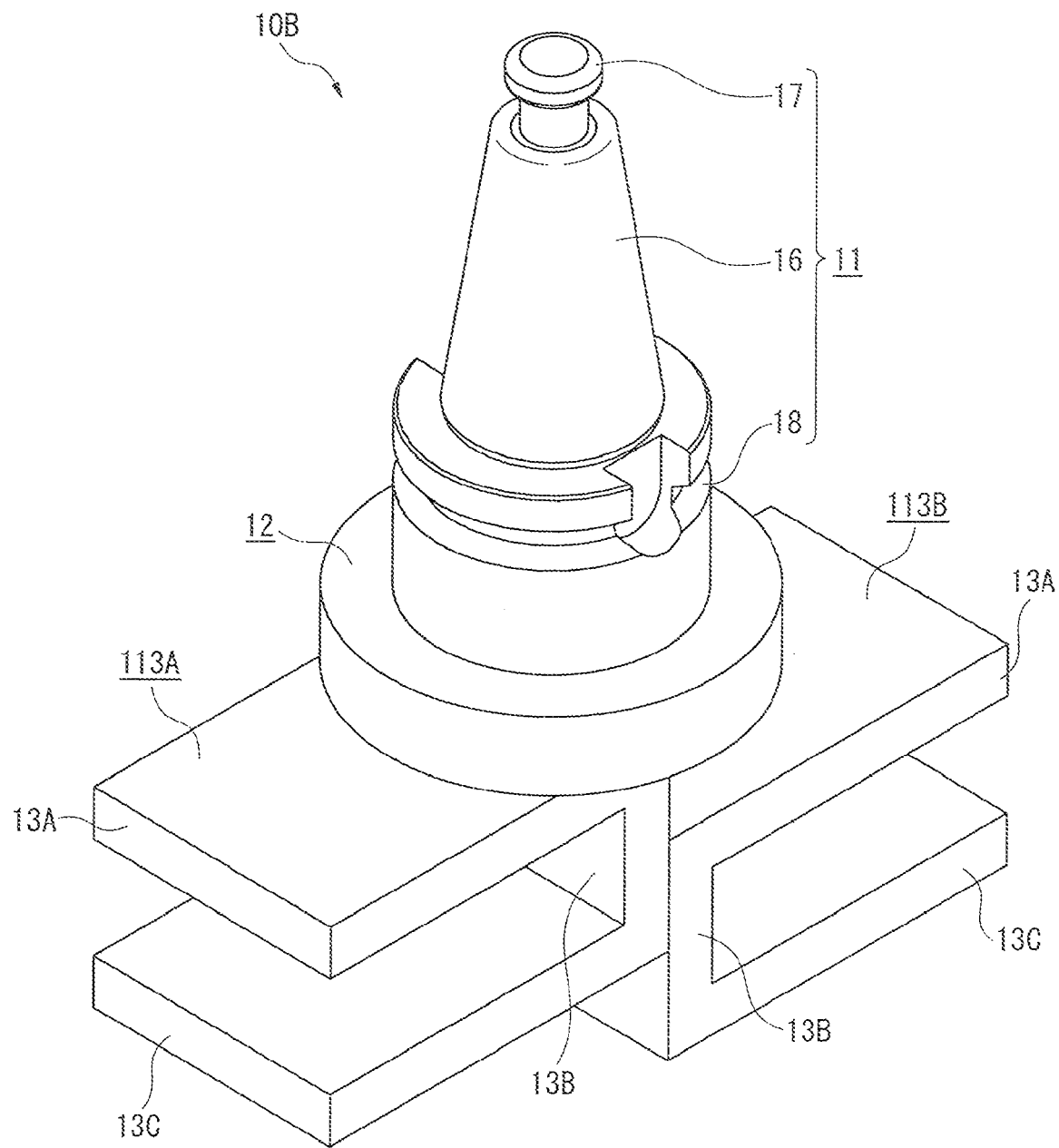
FIG. 9 is a perspective view showing a second modification of the block-transferring tool of the invention.

FIG. 9 is an illustration showing a second modification of the block-transferring tool.

In a block-transferring tool 10B, two square-C-shaped block holders 113A and 113B are provided back-to-back. Specifically, a second block holder 113B, which includes an attachment piece 13A, an extension piece 13B and an insert piece 13C as a second insert piece, is attached to a first block holder 113A, which includes the attachment piece 13A, the extension piece 13B and the insert piece 13C as a first insert piece, the first and second block holder 113A and 113B being respectively provided at different heights in an extending direction of the extension piece 13B.

According to the block-transferring tool 10B, the first bottom block 60 is lifted up by the first block holder 113A and then the second bottom block 60 is lifted up by the first block holder 113B. In other words, the two bottom blocks 60 can be lifted up. Accordingly, the bottom blocks 60 can be efficiently transferred to the workpiece placing position 28B. Moreover, the bottom blocks 60 can be efficiently returned to the storage area.

In the block-transferring tool 10B of FIG. 9, the extension piece 13B of the first block holder 113A and the extension piece 13B of the second block holder 113B may be integrally formed. Moreover, the insert piece 13C may be formed as shown in FIGS. 8A, 8B and 8C.

Figure 10:
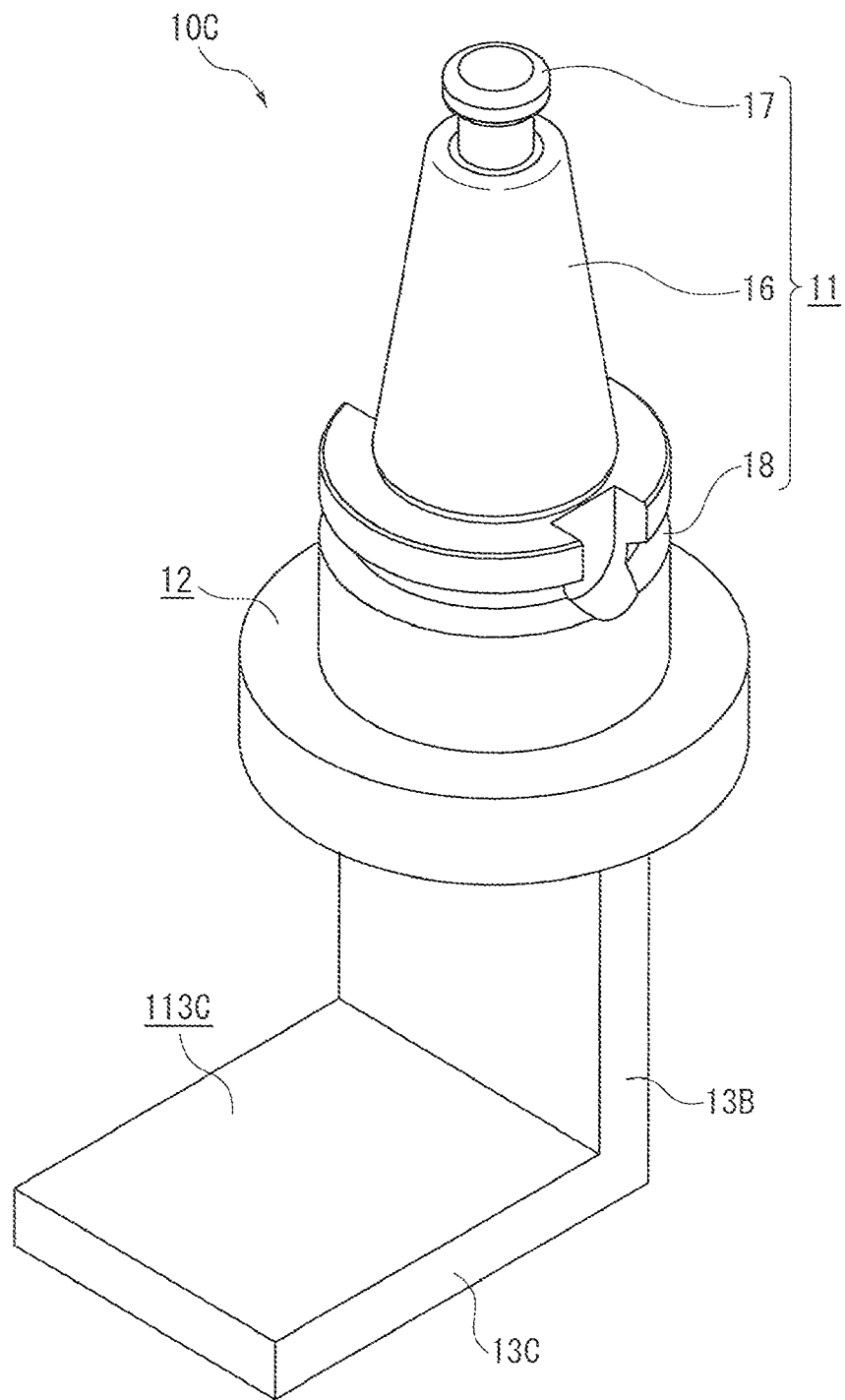
FIG. 10 is a perspective view showing a third modification of the block-transferring tool of the invention.

FIG. 10 is an illustration showing a third modification of the block-transferring tool.

A block-transferring tool 10C includes an L-shaped block holder 113C. Specifically, the L-shaped block holder 113C includes: an extension piece 13B extending from a lower surface of a separator 12 in an axial direction of a main shaft attachment 11: and an insert piece 13C provided on an end of the extension piece 13B substantially orthogonally to the extension piece 13B, the insert piece 13 C being capable of being inserted into a space 60D of the bottom block 60.

Accordingly, according to the block-transferring tool 10C, after the insert piece 13 C is inserted into the space 60D of the bottom block 60, the bottom block 60 is lifted up and is transferred to the workpiece placing position 28B. Thus, the block-transferring tool 10C can be provided by a quite simple and inexpensive arrangement.

In the block-transferring tool 10C of FIG. 10, the insert piece 13C may be formed as shown in FIGS. 8A, 8B and 8C.

Figure 11:
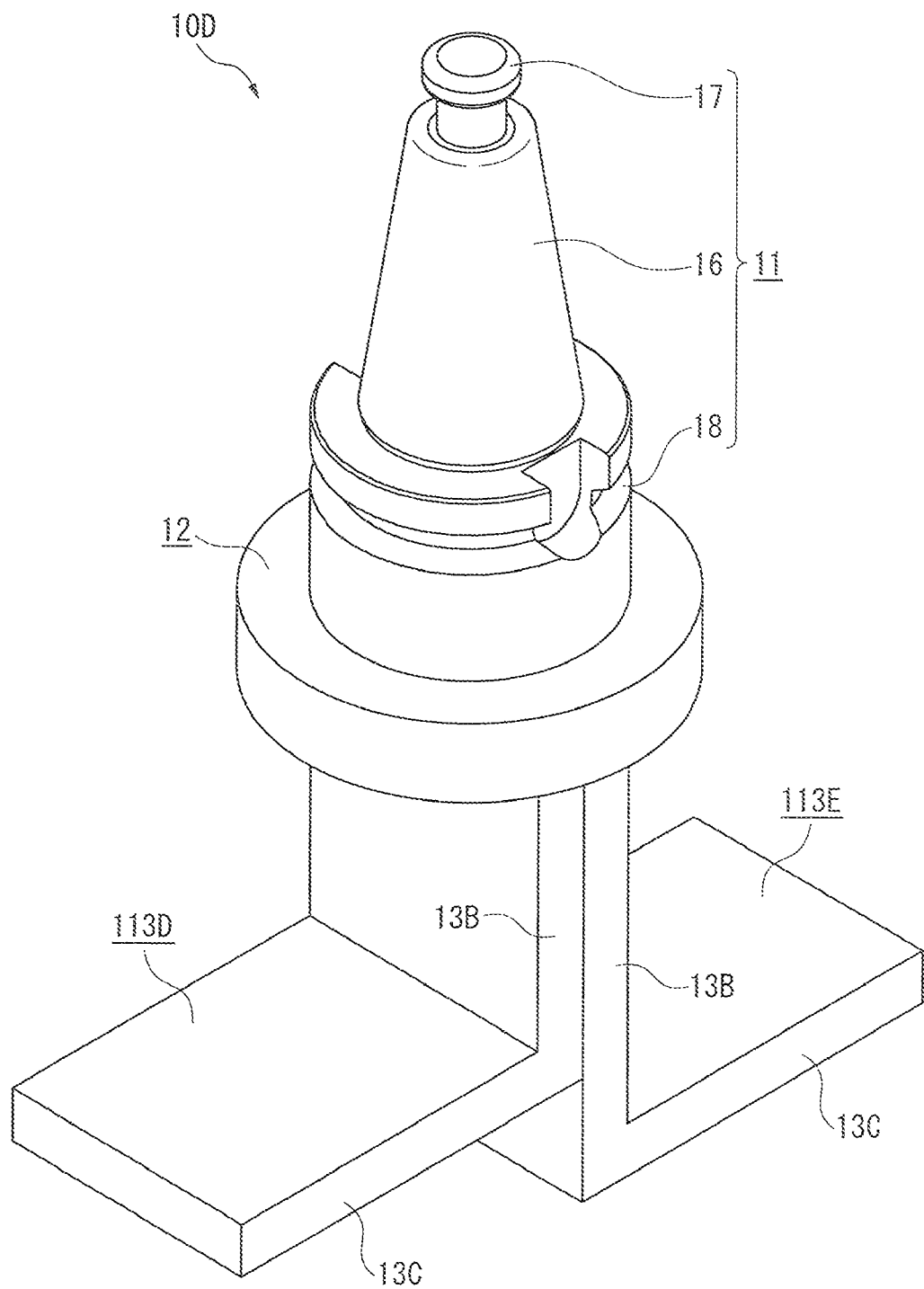
FIG. 11 is a perspective view showing a fourth modification of the block-transferring tool of the invention.

FIG. 11 is an illustration showing a fourth modification of the block-transferring tool.

In a block-transferring tool 10D, two L-shaped block holders 113D and 113E are provided back-to-back. Specifically, a first block holder 113D having an extension piece 13B and an insert piece 13C as a first insert piece, and a second block holder 113E having an extension piece 13B and an insert piece 13C as a second insert piece are respectively provided at different heights in an extending direction of the extension piece 13B.

According to the block-transferring tool 10D, the first bottom block 60 is lifted up by the first block holder 113D and then the second bottom block 60 is lifted up by the first block holder 113E, in other words, the two bottom blocks 60 can be lifted up by one tool. Accordingly, the bottom blocks 60 can be efficiently transferred to the workpiece placing position 28B. Moreover, the bottom blocks 60 can be efficiently returned to the storage area.

In the block-transferring tool 10D of FIG. 11, the extension piece 13B of the first block holder 113D and the extension piece 13B of the second block holder 113E may be integrally formed. Moreover, the insert piece 13C may be formed as shown in FIGS. 8A, 8B and 8C.

Figure 12:
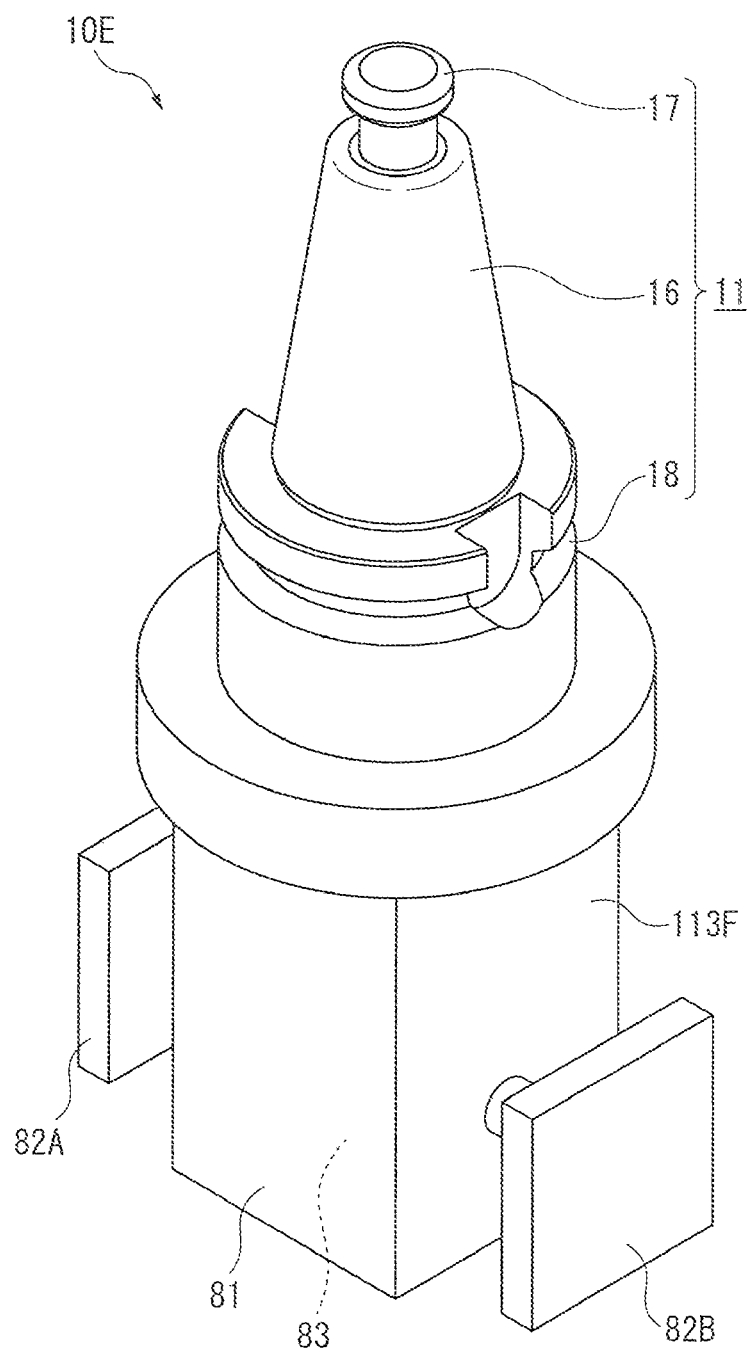
FIG. 12 is a perspective view showing a fifth modification of the block-transferring tool of the invention.
Figure 13:
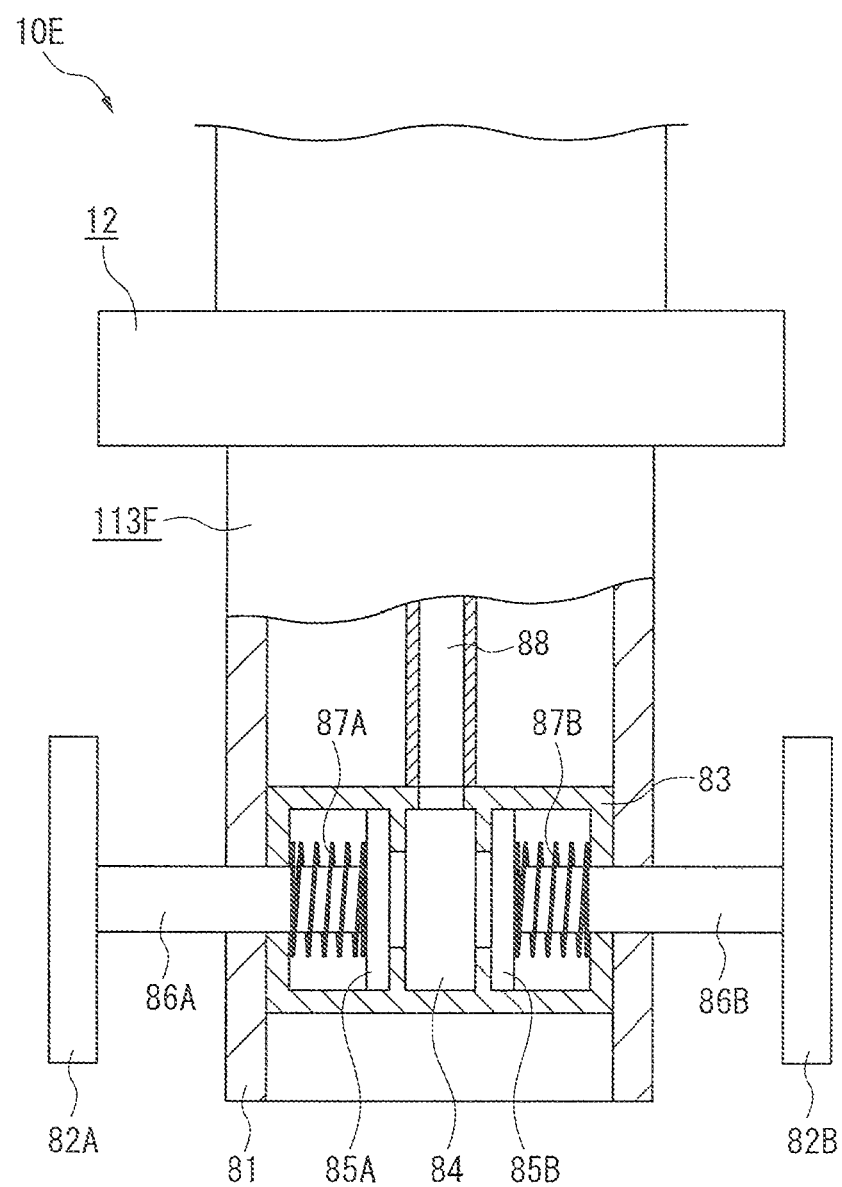
FIG. 13 is a cross sectional view showing the fifth modification of the invention.

FIGS. 12 and 13 each are illustrations showing a fifth modification of the block-transferring tool.

A block-transferring tool 10E includes: a square cylindrical body 81 provided on a lower surface of a separator 12; press portions 82A and 82B provided on both sides of the body 81 substantially orthogonally to an axial direction of a main shaft attachment 11 and opposing each other, the press portions 82A and 82B being capable of being inserted into the space 60D of the bottom block 60; and a lock mechanism 83 pressing the press portions 82A and 82B in directions separating from each other.

The lock mechanism 83 includes: a cylinder chamber 84 formed inside the body 81; two pistons 85A and 85B slidably housed in the cylinder chamber 84; piston rods 86A and 86B respectively integrally formed with the pistons 85A and 85B, the piston rods 86A and 86B penetrating through side walls of the body 81 to be respectively connected to press portions 82A and 82B; and two springs 87A and 87B that are respectively housed in one chamber (outer chamber) in the cylinder partitioned by the pistons 85A and 85B and bias the pistons 85A and 85B in directions such that the press portions 82A and 82B approach to each other. The inner chamber of the cylinder chamber 84 is supplied with compressed air through an air passage 88 formed in the main shaft attachment 11 and an air passage formed in the spindle 30 (the main shaft). In other words, the lock mechanism 83 includes an actuator that is driven by the air supplied through the spindle 30 (the main shaft).

While the block-transferring tool is attached to the main shaft of the machine such as the horizontal machining center, when air is supplied in the inner chamber of the cylinder chamber 84 through the air passage, the pistons 85A and 85B are moved outwardly from the middle of FIG. 12 while compressing the springs 87A and 87B. Accordingly, the press portions 82A and 82B are moved in directions separating from each other and press the side walls 60C on both sides of the bottom block 60. In other words, the bottom block 60 can be held while the press portions 82A and 82B pressing inner walls of the bottom block. Accordingly, the bottom block 60 can be safely transferred to a desired position.

Figure 14:
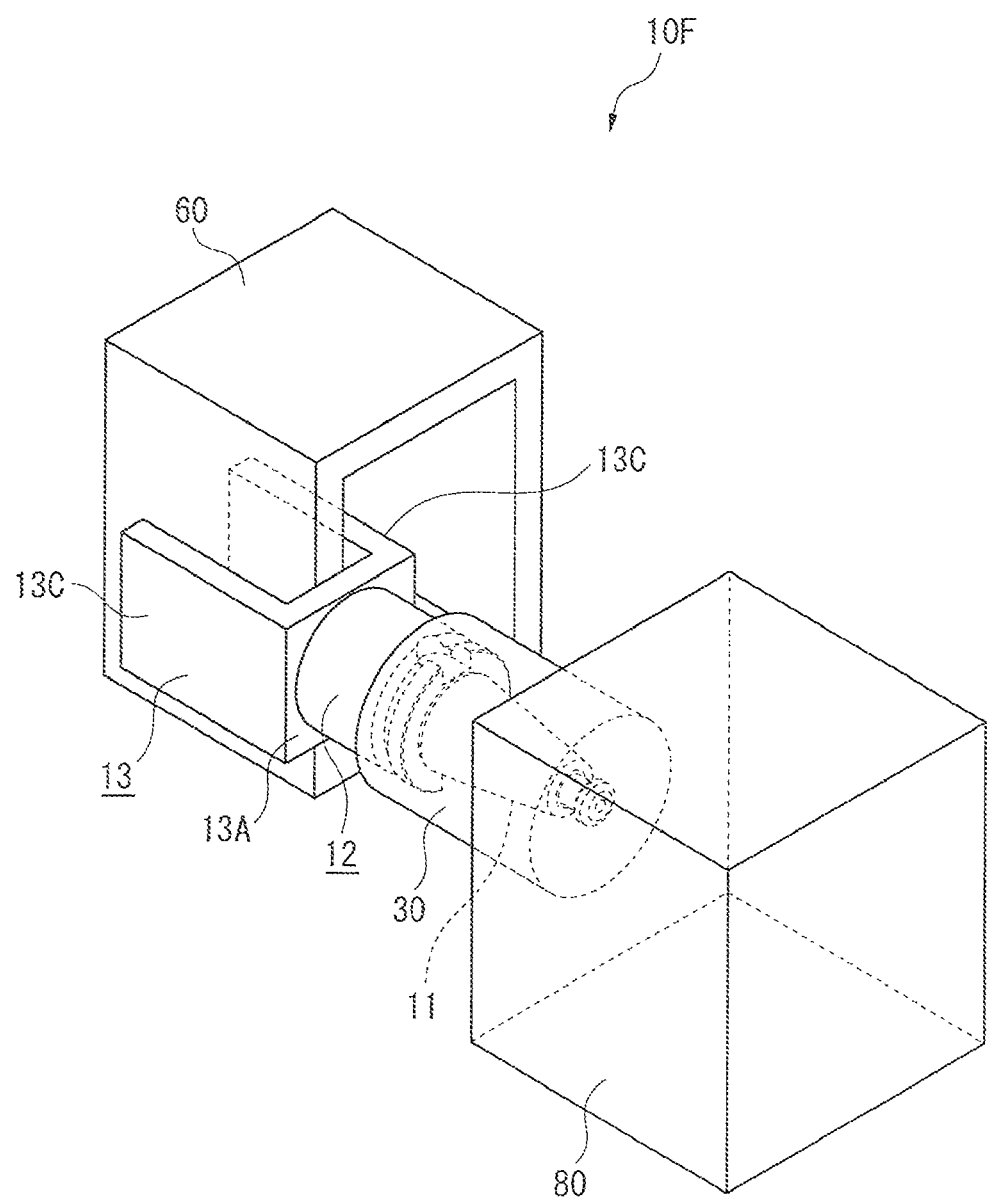
FIG. 14 is a perspective view showing a sixth modification of the block-transferring tool of the invention.
Figure 15A:
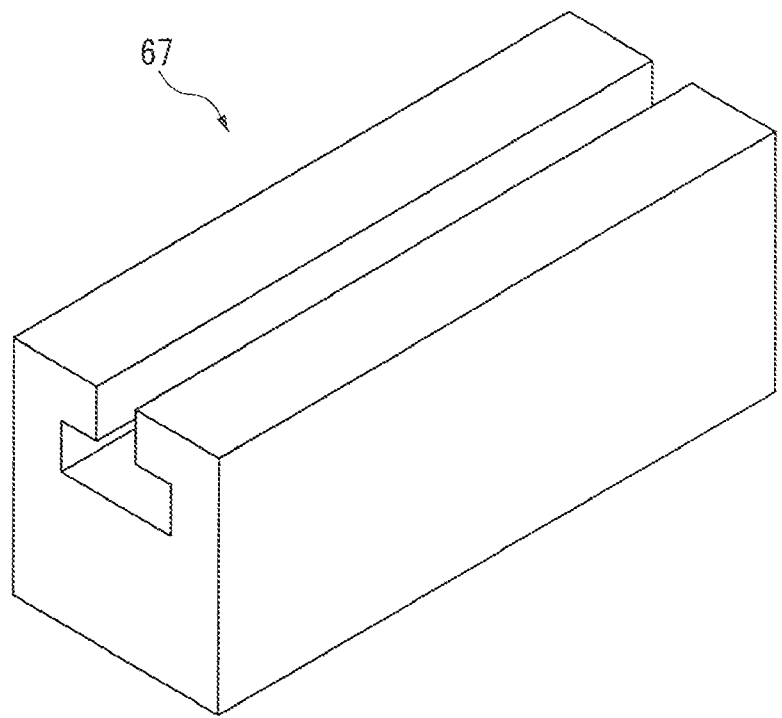
FIG. 15A is an illustration showing a modification of the bottom block to be used in the exemplary embodiment of the invention.
Figure 15B:
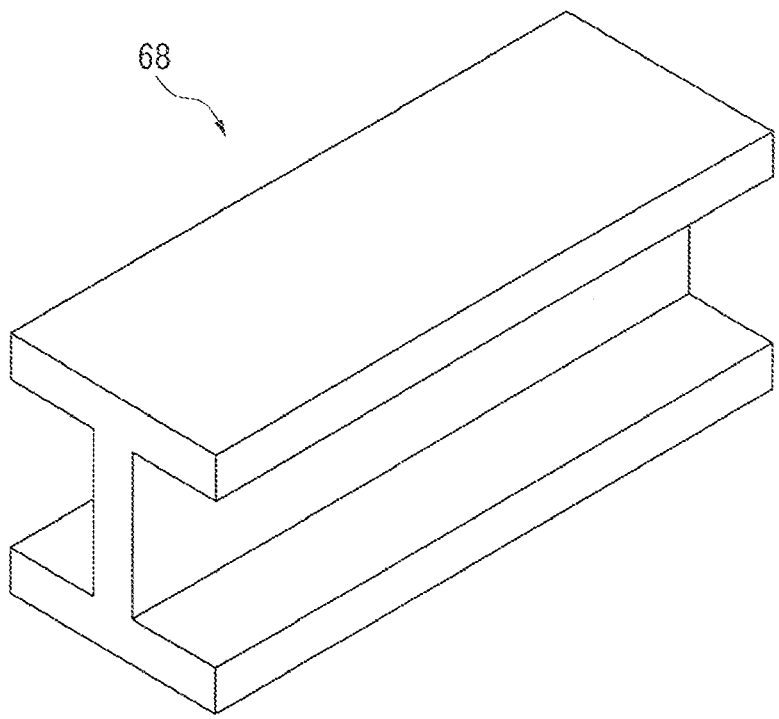
FIG. 15B is an illustration showing another modification of the bottom block to be used in the exemplary embodiment of the invention.

FIG. 14 is an illustration showing a sixth modification of the block-transferring tool.

A block-transferring tool 10F includes a block holder different from that of the first exemplary embodiment. The block holder 13, which is square C-shaped, includes: an attachment piece 13A attached to a separator 12; and two insert pieces 13C and 13C extending from both ends of the attachment piece 13A in an axial direction of the main shaft attachment 11.

When the block-transferring tool 10F is attached to the main shaft of the machine such as the horizontal machining center, the insert pieces 13C and 13C can be held while gripping one side wall of the bottom block 60.

Modification(s) of Bottom Block

In the above example(s), the bottom block is shaped in a rectangular frame, but the shape of the bottom block is not limited to the example(s).

For instance, the bottom block may be provided by a bottom block 67 having an adverse T slot or a rail-shaped bottom block 68. The bottom block 67 having an adverse T slot may be transferred with the use of a block-transferring tool having an adverse-T-shaped block holder to be fitted in the T slot. The rail-shaped bottom block 68 may be transferred with the use of the block-transferring tool 10A as shown in FIGS. 5 and 6 for gripping a vertical piece of the rail.

Moreover, the bottom block may be solid. In this case, the bottom block is shaved. By using a block-transferring tool having a screw block holder to be screwed into the shaved bottom block, the bottom block may be lifted up or controllably directed by a rotation positioning of C axis.

Further, the bottom block may be simply structured to have a hole. In this case, a block-transferring tool having a stick-shaped block holder may be used so that the stick is inserted into the hole. Further, a plurality of the sticks may be used like a fork to lift up the bottom block.

Figure 16:
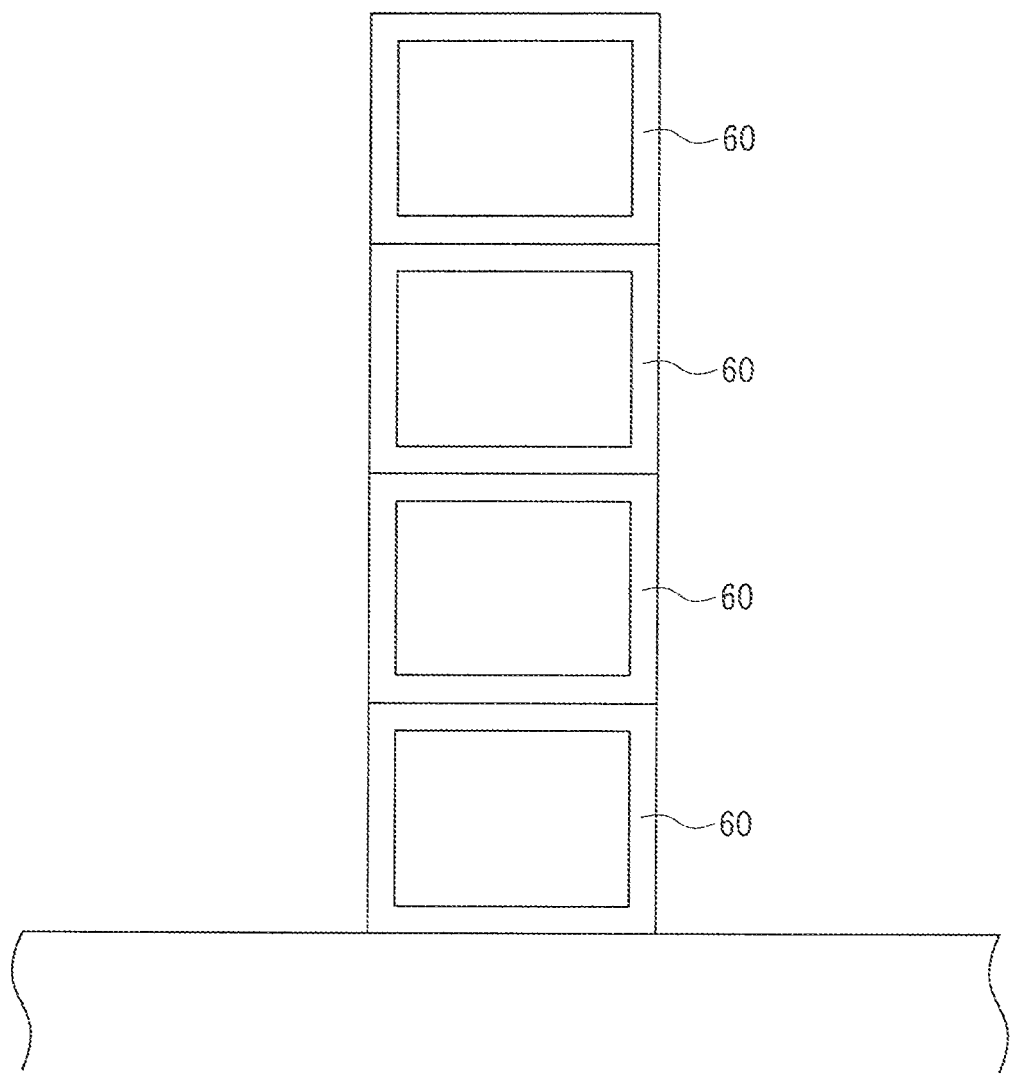
FIG. 16 is an illustration showing a layout example of the bottom block to be used in the exemplary embodiment of the invention.
Figure 17A:
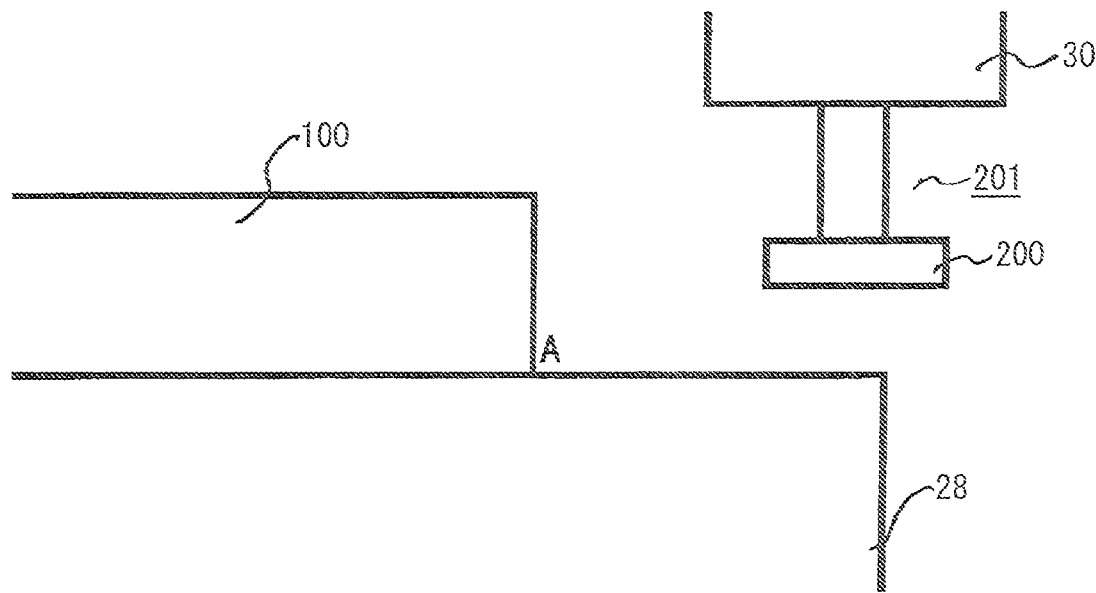
FIG. 17A is an illustration showing a problem in machining workpiece.
Figure 17B:
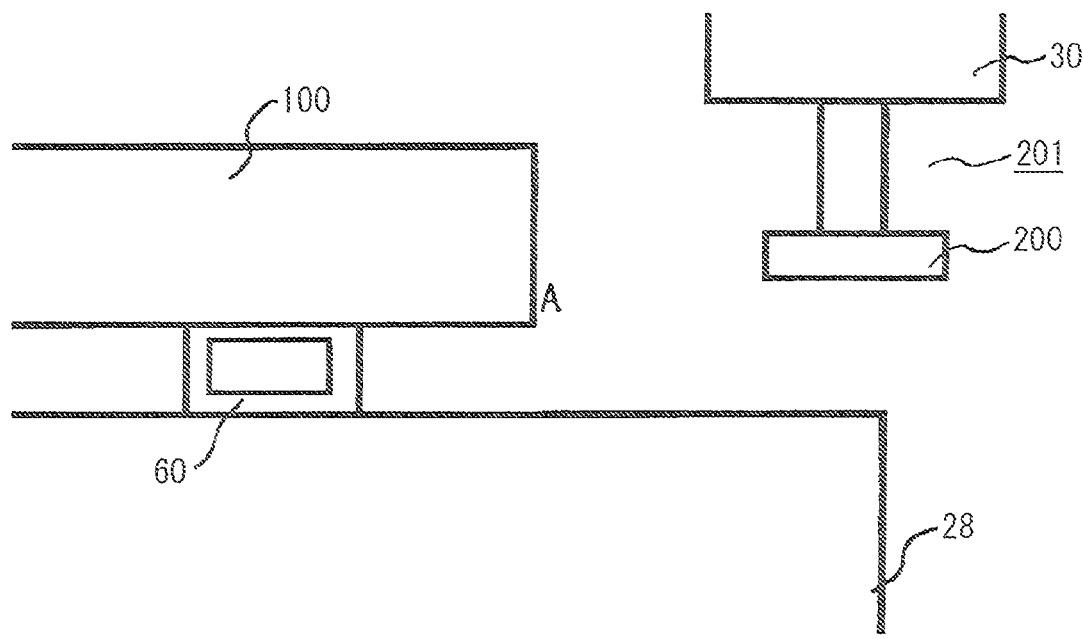
FIG. 17B is an illustration showing a layout example of the bottom block.

Moreover, when the bottom block 60 is placed on the block storage area 28A, the layout of the bottom blocks 60 is not limited to the above example showing that the bottom blocks 60 are spaced apart from each other at an interval on the upper surface of the table 28. For instance, as shown in FIG. 16, the bottom blocks 60 may be vertically piled up.

Other Modification(s)

In the above exemplary embodiment, the block-transferring tools 10, 10A to 10E are housed in the tool magazine 40 and are exchangeably attached to the spindle 30 in use. However, the block-transferring tools 10, 10A to 10E may be stored in a place other than the tool magazine 40. Moreover, the block-transferring tools 10, 10A to 10E may be manually attached to the spindle 30 without being housed in the tool magazine 40.

C-axis rotation positioning control of the portal-framed machine tool as a machine tool is used for controlling the directions of the block-transferring tools 10, 10A to 10E to correspond to the directions of the bottom block 60 (61 to 66). However, the table may perform the rotation control. In other types of machine tools such as a horizontal machining center, other rotation axes, e.g., A axis or B axis, or a parallel axis thereof may perform the rotation control. The rotation control is not limited to this example.

In the above example, the block storage area 28A is defined as the upper surface of the table 28, but is not limited thereto. As long as an area in which the block-transferring tools 10, 10A to 10E can hold the bottom block, any area other than the table 28 may be applicable for carrying out the invention.

What is claimed is:

1. A block-transferring tool for use with a machine tool, the machine tool comprising a table and a main shaft that are relatively movable in three-dimensional directions, the tool comprising:
   a main shaft attachment attached to the main shaft;
   a block holder configured to hold the bottom block; and
   a separator provided between the main shaft attachment and the block holder; wherein:
   the block-transferring tool is configured to lift a bottom block;
   the bottom block comprises:
      a bottom wall disposed on the table, the bottom wall comprising a first end and a second end;
      a top wall disposed in parallel to and apart from the bottom wall, the top wall comprising a first end and a second end;
      a first side wall connecting the first end of the bottom wall and the first end of the top wall; and
      a second side wall connecting the second end of the bottom wall and the second end of the top wall;
   the bottom block being formed in a cross-sectionally rectangular frame comprising an internal space, and
   the block holder comprises:
      an extension piece extending in a longitudinally axial direction of the main shaft attachment; and
      an insert piece disposed on an end of the extension piece substantially orthogonally to the extension piece, the insert piece being configured to be inserted into the internal space of the bottom block.

2. The block-transferring tool according to claim 1, wherein
   the insert piece comprises: a first insert piece provided on the end of the extension piece substantially orthogonally to the extension piece, the first insert piece being capable of being inserted into the space of the bottom block: and a second insert piece provided on the extension piece substantially orthogonally to the extension piece and projecting toward the opposite side of the first insert piece, the second insert piece being capable of being inserted into the space of the bottom block, tile first insert piece and the second insert piece being respectively provided at different heights in an extending direction of the extension piece.

3. The block-transferring tool according to claim 1, wherein
   the block holder comprises a lock mechanism for pressing a part of the bottom block to the insert piece for locking.

4. The block-transferring tool according to claim 1, wherein
   the block holder comprises: press portions provided substantially orthogonally to an axial direction of the main shaft attachment and in directions opposing each other, the press portions being capable of being inserted into the internal space of the bottom block; and a lock mechanism that presses the press potions in directions separating from each other.

5. The block-transferring tool according to claim 3, wherein
   the lock mechanism comprises an actuator that is driven by the air supplied through the main shaft to which the main shaft attachment is attached.

6. A machine tool, comprising:
   a table;
   a main shaft;
   a relative movement mechanism configured to relatively move the table and the main shaft in three-dimensional directions;
   a block-transferring tool and a plurality of machining tools that are detachably attached to the main shaft, the block-transferring tool being configured to lift a bottom block;
   a tool magazine configured to house the block-transferring tool and the plurality of machining tools; and
   a tool changer configured to attach a specified one of the block-transferring tool and the plurality of machining tools housed in the tool magazine to the main shaft; wherein
   a block storage area is provided on an upper surface of the table and is configured to place the bottom block that supports a workpiece in a manner spaced apart from the upper surface of the table;
   the block-transferring tool comprises: a main shaft attachment attached to the main shaft; a block holder configured to hold the bottom block; and a separator provided between the main shaft attachment and the block holder, wherein the bottom block comprises:
  a bottom wall disposed on the table, the bottom wall comprising a first end and a second end;
  a top wall disposed in parallel to and apart from the bottom wall, the top wall comprising a first end and a second end;
  a first side wall connecting the first end of the bottom wall and the first end of the top wall; and
  a second side wall connecting the second end of the bottom wall and the second end of the top wall;
  the bottom block being formed in a cross-sectionally rectangular frame comprising an internal space, and
the block holder comprises:
  an extension piece extending in a longitudinally direction of the main shaft attachment; and
  an insert piece disposed on an end of the extension piece substantially orthogonally to the extension piece, the insert piece being configured to be inserted into the internal space of the bottom block.

* * * * *